United States Patent
Gordon et al.

(10) Patent No.: US 9,843,577 B2
(45) Date of Patent: Dec. 12, 2017

(54) REVOKING SESSIONS USING SIGNALING

(71) Applicant: Microsoft Technology Licensing, LLC, Redmond, WA (US)

(72) Inventors: Ariel Gordon, Kirkland, WA (US); Samuel Devasahayam, Kirkland, WA (US); Lu Zhao, Redmond, WA (US); Yordan Rouskov, Seattle, WA (US); Parmeshwar Miguel Sequeira Arewar, Bothell, WA (US); Venkatesh Gopalakrishnan, Bellevue, WA (US); Sarat Chandra Subramaniam, Redmond, WA (US); Titus Constantin Miron, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/365,726

(22) Filed: Nov. 30, 2016

(65) Prior Publication Data
US 2017/0085553 A1 Mar. 23, 2017

Related U.S. Application Data

(62) Division of application No. 14/452,726, filed on Aug. 6, 2014, now Pat. No. 9,537,851.

(51) Int. Cl.
*H04L 29/06* (2006.01)
*H04L 29/08* (2006.01)

(52) U.S. Cl.
CPC ............ *H04L 63/083* (2013.01); *H04L 63/08* (2013.01); *H04L 63/102* (2013.01); *H04L 67/14* (2013.01); *H04L 69/28* (2013.01); *H04L 63/1416* (2013.01); *H04L 67/02* (2013.01)

(58) Field of Classification Search
CPC ......... G06F 21/31; G06F 21/41; H04L 63/08; H04L 67/02; H04L 67/14; H04L 67/26
USPC ............................................................. 726/6
See application file for complete search history.

(56) References Cited

U.S. PATENT DOCUMENTS

| 6,892,307 B1 | 5/2005 | Wood et al. |
| 6,944,761 B2 * | 9/2005 | Wood ...................... G06F 21/31 713/155 |
| 8,572,683 B2 | 10/2013 | Radhakrishnan et al. |
| 8,812,860 B1 * | 8/2014 | Bray ...................... G06F 21/62 713/182 |

(Continued)

OTHER PUBLICATIONS

U.S. Appl. No. 14/452,726, filed Aug. 6, 2014, Gordon et al.

(Continued)

*Primary Examiner* — Syed Zaidi
(74) *Attorney, Agent, or Firm* — Workman Nydegger

(57) ABSTRACT

Embodiments are directed to revoking user sessions using signaling. In one scenario, an identity platform operating on a computer system receives an indication indicating that a user's login account has been compromised, where the user's login account has an associated login session and corresponding session artifact that is valid for a specified amount of time. The identity platform generates a signal indicating that the login session is no longer trusted and that the user is to be re-directed to the identity platform to re-authenticate and renew the session artifact and provides the generated signal to various relying parties including at least one relying party that is hosting the login session for the user.

17 Claims, 4 Drawing Sheets

(56) References Cited

U.S. PATENT DOCUMENTS

| | | | |
|---|---|---|---|
| 2003/0217096 | A1 | 11/2003 | McKelvie et al. |
| 2009/0132813 | A1 | 5/2009 | Schibuk |
| 2012/0260322 | A1 | 10/2012 | Logan et al. |
| 2012/0290712 | A1 | 11/2012 | Walter et al. |
| 2012/0297484 | A1 | 11/2012 | Srivastava |
| 2013/0047226 | A1* | 2/2013 | Radhakrishnan ....... G06F 21/33 726/6 |
| 2013/0212665 | A1 | 8/2013 | Goyal et al. |
| 2014/0020077 | A1 | 1/2014 | Court et al. |
| 2014/0165147 | A1 | 6/2014 | Hershberg et al. |
| 2016/0044011 | A1 | 2/2016 | Gordon et al. |

OTHER PUBLICATIONS

Pansari, Ankur., "How-To: Handle expired access tokens", Published on: May 13, 2011 Available at: https://developers.facebook.com/blog/post/2011/05/13/how-to--handle-expired-access-tokens.

Mortimore, et al., "Implementing Single Sign-On Across Multiple Organizations", Retrieved on: Jun. 19, 2004 Available at: https://developer.salesforce.com/page/Implementing_Single_Sign-On_Across_Multiple_Organizations.

D'Souza, Erwin., "Remote sign out and info to help you protect your Gmail account", Published on: Jul. 7, 2008 Available at: http://gmailblog.blogspot.in/2008/07/remote-sign-out-and-info-to-help-you.html.

"International Search Report and Written Opinion Issued in PCT Application No. PCT/US2015/042553", dated Oct. 20, 2015, 11 Pages.

Lodderstedt, et al., "RFC 7009 OAuth 2.0 Token Revocation", Retrieved from <<https://tools.ietf.org/pdf/rfc7009.pdf>>, Aug. 31, 2013, 11 Pages.

Hardt, Dick , "RFC 6749 The OAuth 2.0 Authorization Framework", Retrieved from <<https://www.rfc-editor.org/rfc/pdfrfc/rfc6749.txt.pdf>>, Oct. 31, 2012, 76 Pages.

"Second Written Opinion Issued in PCT Application No. PCT/US2015/042553", dated Jun. 20, 2016, 6 Pages.

"International Preliminary Report on Patentability Issued in PCT Application No. PCT/US2015/042553", dated Oct. 14, 2016, pp. 12.

Noureddine, M., and R. Bashroush. "A provisioning model towards OAuth 2.0 performance optimization." Cybernetic Intelligent Systems (CIS), 2011 IEEE 10$^{th}$International Conference on. IEEE, 2011.

U.S. Appl. No. 14/452,726, dated Nov. 4, 2015, Restriction Requirement.

U.S. Appl. No. 14/452,726, dated Nov. 16, 2015, Office Action.

U.S. Appl. No. 14/452,726, dated Mar. 17, 2016, Final Office Action.

U.S. Appl. No. 14/452,726, dated Sep. 14, 2016, Notice of Allowance.

* cited by examiner

REVOKING SESSIONS USING SIGNALING

This application is a divisional of, and claims priority to and the benefit of, U.S. patent application Ser. No. 14/452,726 filed on Aug. 6, 2014 and entitled "REVOKING SESSIONS USING SIGNALING," which application is hereby expressly incorporated herein by this reference in its entirety.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems allow users to establish login sessions with servers that provide private information for authenticated users. These login sessions may use artifacts that allow the sessions to remain alive for long periods of time, after which the session will expire and the user will be asked to re-authenticate. If an attacker determines a user's login credentials, the attacker may have a long window in which those credentials are valid, even if the breach in security is detected relatively quickly.

BRIEF SUMMARY

Embodiments described herein are directed to revoking user sessions using signaling. In one embodiment, an identity platform operating on a computer system receives an indication that a user's login account has been compromised, where the user's login account has an associated login session and corresponding session artifact that is valid for a specified amount of time. The identity platform generates a signal indicating that the login session is no longer trusted and that the user is to be redirected to the identity platform to re-authenticate, in order to renew the session artifact; the identity platform provides the generated signal to various relying parties including at least one relying party that is hosting the login session for the user.

In another embodiment, a computer system signals to one or more entities that a login session is to be revoked. The computer system receives an indication that credentials associated with a user account have been changed or updated, where the user account has at least one associated login session. The computer system determines that a session token associated with the user's login session was issued before the time of credential change indicated on the received indication and, based on the determination, the computer system signals to an identity platform that the user's login session is to be revoked.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
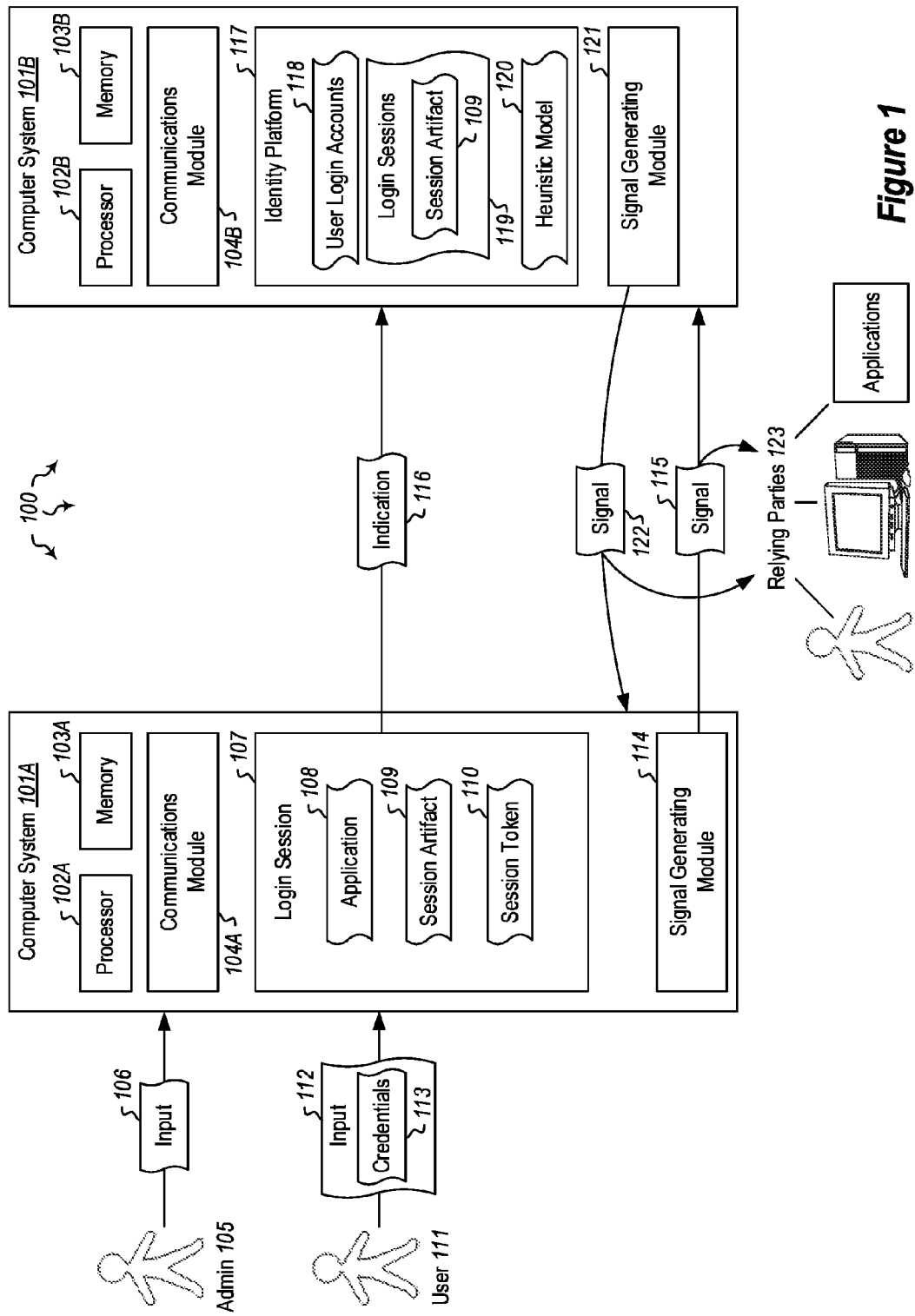
FIG. 1 illustrates a computer architecture in which embodiments described herein may operate including revoking user sessions using signaling.

Embodiments described herein are directed to revoking user sessions using signaling. In one embodiment, an identity platform operating on a computer system receives an indication indicating that a user's login account has been compromised, where the user's login account has an associated login session and corresponding session artifact that is valid for a specified amount of time. The user's login account compromise may not only involve their credential compromise but also compromise of session artifacts at either the Identity platform level or at the relying party level. Compromise of session artifacts at the relying party level would only compromise that relying party but compromise at the Identity platform level would involve compromising many (or even most) of the relying parties. The identity platform generates a signal indicating that the login session is no longer trusted and that the user is to be redirected to the identity platform to re-authenticate, in order to renew the session artifact; the identity platform provides the generated signal to various relying parties including at least one relying party that is hosting the login session for the user.

In another embodiment, a computer system signals to one or more entities that a login session is to be revoked. The computer system receives an indication that credentials associated with a user account have been changed or updated, where the user account has at least one associated login session. The computer system determines that a session token associated with the user's login session was issued before the time of credential change or update indicated on the received indication and, based on the determination, the computer system signals to an identity platform that the user's login session is to be revoked.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system (e.g. 101A or 101B) typically includes at least one processing unit (e.g. 102A/102B) and memory (e.g. 103A/103B). The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101A. Computing system 101A may also contain communication channels that allow the computing system 101A to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer systems 101A and 101B. Computer systems 101A and 101B may be any type of local or distributed computer systems, including cloud computing systems. The computer systems 101A/101B include modules for performing a variety of different functions. For instance, the communications module 104A/104B may be configured to communicate with other computing systems. The communications module 104A/104B, for example, may include any wired or wireless communication means that can receive and/or transmit data to or from other computing systems. The communications module 104A/104B may be configured to interact with databases, mobile computing devices (such as mobile phones or tablets), embedded or other types of computing systems.

Computer system 101A may further include a login session 107. The login session may include associated items such as a session artifact 109 that allows a user (e.g. 111) to remain logged in to the session for an extended amount of time (perhaps days, weeks or longer). The artifact may be a cookie file or other type of data structure. The login session may also have a session token 110 associated with it that remains valid for a specified period of time. Upon expiration, the session token no longer allows the user to access applications 108 or other data that is only available through the login session 107. While logged in (i.e. while the session is still valid and active), the user may access these (remote or local) applications 108 and interact with them as an authenticated user. As such, the user 111 may access those portions of data to which they have access as an authenticated user.

It should be noted that in a single sign-on (SSO) system, there may be at a minimum two parties which would maintain these session artifacts. For example, the parties may include an authentication service and a relying party. The authentication service may involve additional authentication services in case a of federated user's scenario in which cases there are a minimum of three parties who are to maintain these session artifacts.

In some cases, the user may desire to change their login credentials or may be prompted to renew their login credentials. The user may thus provide their updated credentials (e.g. username and password, biometric credentials, tokens, passphrases or other credentials) 112 in input 113. In such cases, when the user's credentials have changed, the sessions previously established for the user become invalid. Similarly, compromise of the session cookies (e.g. at a shared kiosk or other computer system) could allow malicious unauthorized access to a user's account. As such, login credentials and session artifacts acquired through login credentials may be updated and changed. The session artifact 109, however, may indicate that the session will still be valid for a specified amount of time. In these cases, the signal generating module 114 may generate a signal 115 that notifies relying parties 123 (which may be other users, other computing systems, other applications or other entities) that the user's session has become stale and is no longer valid. The signal 109 may also be sent to an identity platform 117 of a cloud or other type of computing system (e.g. computer system 101B). The identity platform 117 may be configured to manage identities and login information for a plurality of users. In some cases, the user may login to the identity platform 117 in order to access applications 108. The identity platform thus includes multiple user login accounts 118 and login sessions 119 (with corresponding session artifacts 109). The identity platform and other services may be hosted on the cloud, and at least in some cases, may be run on a virtual machine in a multi-tenant system. Thus, it should be noted that the identity platform and the relying parties may be multi-tenant themselves, and instances of these individual services may be running on a VM on a host which is also sharing VMs from other hostile/non-hostile tenants.

In some cases, as described above, the identity platform 117 will be notified of invalid sessions by signal 115 sent from computer system 101A. This signal may be sent in cases where the user changes their login credentials, or when the administrator 105 determines that an account has been compromised and is invalid. In other cases, the identity platform may determine that a session is invalid. The user 111 may have requested the identity platform 117 to change their login credentials, or the identity platform may have used a heuristics model 120 to determine that suspicious activity has occurred on the user's login account and that its associated sessions are to be revoked. In such cases, the signal generating module 121 of the identity platform 117 may generate a signal 122 to notify other relying parties 123 and computing systems such as computer system 101A. In this manner, regardless of who determines the invalidity of a login session, or how it is determined or where it is determined, each computer system may notify the other and other related parties using signaling.

Indeed, embodiments described herein include a series of signaling mechanisms between identity platform components and relying parties 123. These embodiments may apply to organizations that have an on-premises identity management system and use a large number of applications and services that are federated to a shared identity security token service. The generated signals (e.g. 115 and 122) allow relying parties to invalidate their session artifacts and send users back to the identity platform 117 for remediation, when such signals are received.

Previously, entities have relied on short lifetimes for session artifacts, which prevents an attacker from using compromised credentials for an extended period of time. This traditional approach, however, forces users to sign in too frequently which dramatically reduces usability. In embodiments described herein, users are only round-tripped to the identity platform 117 to re-sign in if a possible compromise has been detected and signaled to the applications (or if the user 111 has chosen to sign out and/or sign in to another account). This makes it possible to eliminate unnecessary sign-ins and reduce the time window between the detection of the account compromise and the lockdown of the account, effectively reducing the ability for an attacker to access compromised resources.

Embodiments herein combine long session artifacts (e.g. that are valid for two days or more) and signaling methods to revoke session artifacts. This eliminates the search for a compromise between short session artifacts (which impacts usability because it forces users to re-sign often) and long session artifact (which impacts security because it leaves a large time window for attackers to access compromised resources). The signaling between a user or administrator and the identity platform 117 may be dissociated from the signaling between the identity platform and the relying parties 123. Each "leg" can be push or pull and can use a combination of many different signals. These signals will be described further below.

Signals can be initiated by an end user 111 or an administrator 105. The signals can be manually triggered (e.g. when an administrator logs in to a console and enters the username of a compromised account) and/or built into existing workflows (e.g. the user changes password, which causes their associated sessions to be revoked across relying parties and devices). The signals can also be automatically generated upon detecting unusual account activity (e.g. the same account has a sign in from the U.S. and China within a short timespan). These different signaling methods allow relying parties 123 to keep long session artifacts (e.g. two days or more) and use signaling to immediately lock out users if an account compromise has been detected/reported.

For the signal to make its way the relying parties 123, various signaling mechanisms for end-users or administrators may be used to signal the account compromise to the identity platform 117. Such signals can be initiated by an end user 111 or an administrator 105. Additionally or alternatively, the signals may be generated after unusual account activity is detected using heuristics 120. Still further, the signals may be generated after a workflow or other event has triggered a credential change. The signals can be pushed (in real time) or pulled (e.g. by a synchronization engine that picks up the changes). Various other signaling mechanisms may also be used to send the signal from the identity platform 117 to the relying parties 123. These signals can also be communicated in a push or pull fashion.

One remediation for users whose accounts have been compromised is to change their password. This change password signal may thus be used to pivot on. In this manner, existing properties of an identity management system may be leveraged to transmit or carry the signal to other entities, as opposed to building new signaling mechanisms.

For example, in cases where a property that records when the user's password was last updated exists, this property may be used for session revocation. If the session token 110 for a session 107 was issued before the time the user's password was last changed, then the current session should be invalidated.

Various methods may be used to determine when the user's password was last changed: 1) Use an existing timestamp property. Many identity management systems record the time at which the user's password was last changed. 2) In cases where organizations do not wish to expose a change password timestamp with external parties, the organization could extend their identity management schema and synchronize another property. This could be, for example, a "revocation timestamp" attribute.

Mechanisms to send the signal from a user or administrator to the identity platform may include accessing existing identity management system synchronization mechanisms to synchronize password timestamps from on-premises identity systems to cloud identity systems (e.g. 117). In some cases, these communications may already be regularly transferred; as such, these signals merely piggyback these synchronization messages. There may, however, be some wait time associated with the synchronization as the synchronization depends on its corresponding service level agreement (SLA) which may be, for example, three 3 hours between synchronizations). This allows end users to sign in to a portal or an application and select an option to "invalidate my sessions on all other devices". It also allows administrators to sign in to a portal or an application, enter a specific user ID or select in a list of users, and select an option to "invalidate these users' sessions on all devices". When users change their password, the identity management system 117 may also provide an option to "invalidate my sessions on all other devices". Still further, a user may be able to selectively choose and revoke particular sessions as desired or as needed.

Still further, embodiments may expose an application programming interface (API) to allow third party developers to integrate the signaling into third party tools and workflows, such as third party security solutions or change password flows. This allows the third party solution to send revocation signals to the identity platform and other relying parties 123. Signaling mechanisms may also be provided to send the revocation signals from applications to other entities including the identity platform 117. Synchronization signals from the identity platform 117 to relying parties 123 may be used to carry the revocation signals (e.g. 122). This would benefit relying parties that have an existing synchronization contract with the identity platform 117 (e.g. for user profile data).

The identity platform may also be used to invalidate central session artifacts (e.g. cookies) and may rely on session synchronization mechanisms to invalidate user session with relying parties. For instance, Open ID Connect's session management polling mechanism may be implemented to invalidate a current session based on user's current state. The identity platform 117 may send push signals to relying parties, using any number of push mechanisms, and relying parties may poll the identity platform at regular intervals via an API call to check the password timestamp. These concepts will be explained further below with regard to methods 200 and 300 of FIGS. 2 and 3, respectively.

Figure 2:
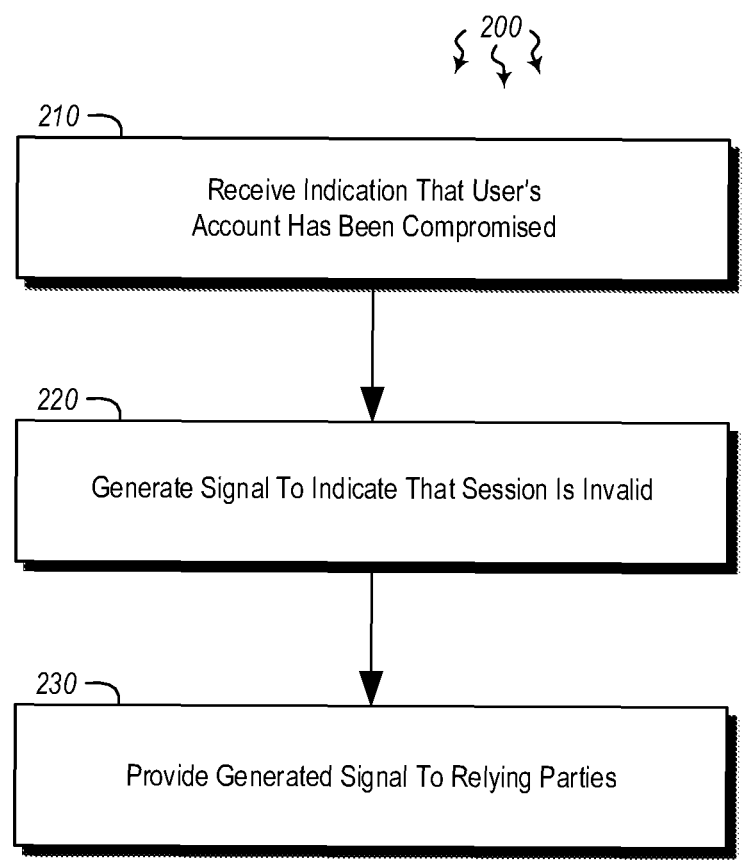
FIG. 2 illustrates a flowchart of an example method for revoking user sessions using signaling.
Figure 3:
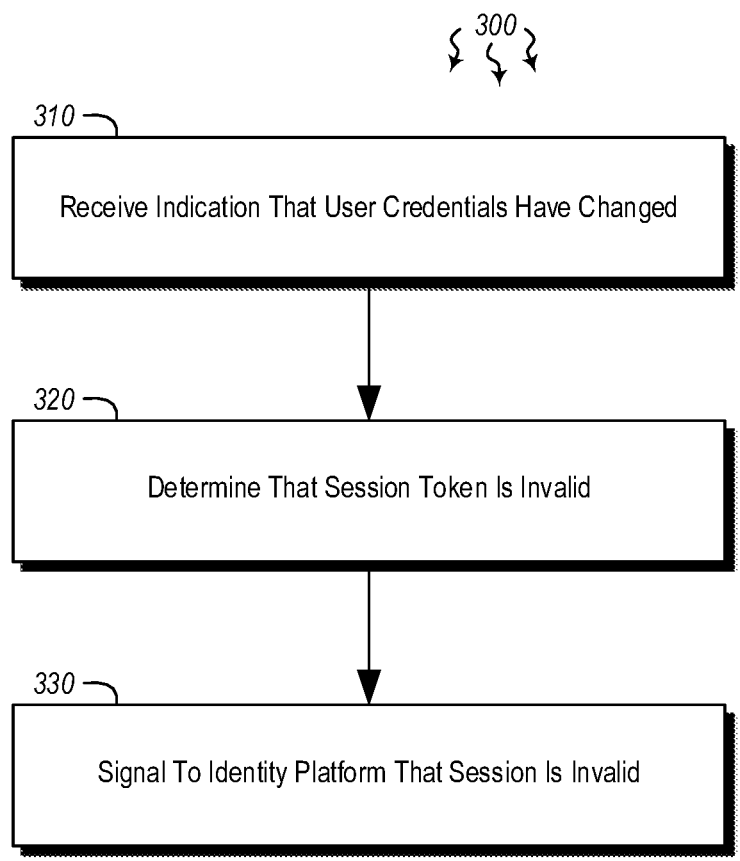
FIG. 3 illustrates a flowchart of an example method for signaling to one or more entities that a login session is to be revoked.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for revoking user sessions using signaling. The method 200 will now be described with frequent reference to the components and data of environment 100.

Method 200 includes an act of receiving, at an identity platform, an indication indicating that a user's login account has been compromised, the user's login account having an associated login session and corresponding session artifact that is valid for a specified amount of time (act 210). For example, identity platform 117 may receive indication 116 indicating that a user's account has been compromised. This indication 116 may be generated based on input 106 from an administrator indicating that the user's account has been compromised, or may be generated based on input 112 from user 111 indicating that their credentials 113 have been changed, resulting in their old login account no longer being valid. Still further, the indication 116 may be generated upon detecting, through heuristics, that a user's account has been compromised or upon detecting through other means that login credentials associated with the user have changed. The heuristics 120 may be configured to look for suspicious login activity such as logging in from two different geographic locations within a short amount of time. Such suspicious account activity may lead the identity platform to determine that a user's account has been compromised and that their previous login sessions are to be revoked.

The user's login session 107 may have one or more associated session artifacts 109. These artifacts may allow the login session to persist for a specified period of time, even if the user is not actively using the session during that time. For instance, the user may login and establish login session 107 and access applications 108 or other information. The identity platform 117 may be configured to store user identifiers and perform the authentication of the user as well as establishing the login session 107. This login session then provides the user access to information and applications or other services which may be specific to that user. The login session may have a session token 110 associated with it. Once the session token has expired, the login session 107 is no longer valid. In some cases, if a user is logged in and accessing applications 108, the expiration of a session token may cause the user to be prompted to login again. If proper authentication credentials are provided, a new session token is issued and the user 111 may continue acting within their login session.

Method 200 further includes an act of generating a signal indicating that the login session is no longer trusted and that the user is to be re-directed to the identity platform to re-authenticate and renew the session artifact (act 220). The signal generating module 121 of computer system 101B may generate a signal 122 that is sent to one or more relying parties 123 and/or to computer system 101A (which is itself a relying party if the user has a login session on that computing system). As used herein, the term "relying party" may include any user, computing system, application, service or other entity that is relying on the validity of the user's credentials. Administrators, mobile devices, login sessions, applications, etc. may each rely on the fact that the user 111 is legitimately using their login account, and that no attacker has the user's credentials. Once the user's credentials have been compromised, any login sessions or devices that trust the user's credentials will need to be notified that those credentials are no longer valid and that associated sessions should be revoked.

Method 200 also includes an act of providing the generated signal to one or more relying parties including at least one relying party that is hosting the login session for the user (act 230). Thus, the signal 122 may be used to notify the relying parties 123 that the user's account has been compromised and that their sessions are to be revoked, regardless of how long the artifact 109 may indicate validity. The signal 122 may be passed in a variety of different ways, and may be passed to the relying parties upon a determination that each recipient is indeed a relying party. For example, the identity platform 117 may track those entities, devices and/or users that rely on the validity of the user's credentials and may designate them as relying parties 123. As such, these specific relying parties will be notified of the compromise of user 111's credentials. Accordingly, the set of relying parties 123 may be different for each user or user login session.

As indicated above, these relying parties may be notified of a compromise in a variety of manners. For instance, the signal 122 generated by module 121 may be pushed to the relying parties via a message broadcast or direct transmission. Alternatively, the signal 122 may be pulled by relying parties as they periodically poll the identity platform 117 for updates. In one embodiment, the generated signal is provided to the relying parties using a synchronization contract between the identity platform and one or more applications 108 that rely on the identity platform for identity management. Thus, the signaling may use an existing synchronization contract between the identity platform 117 and the applications that renews every (variable) number of hours. As such, the signal may indicate to the applications that they are to renew on the next synchronization.

In one embodiment, the generated signal 122 may be relayed from an on-premises identity management platform to a cloud identity management platform using push messaging or pull messaging. For instance, if an on-premises identity management platform is operating on computer system 101A, it may be configured to interoperate with other identity platforms such as a cloud identity platform running on computer system 101B. In such cases, the signal generating module 114 of computer system 101A may generate signal 115 which is pushed or pulled to the identity platform 117 and/or other relying parties 123. An on-premises identity management platform may, for example, receive input from an administrator 105 indicating that a user's login account has been compromised and generate the signal 115 in response. In some cases, the administrator 105 may make changes to a synchronization contract that cause a timestamp of when the user last changed their credentials to be synchronized with the identity platform. This is one way of signaling to the identity platform that the user's credentials have changed and that prior or existing login sessions are to be revoked.

In other cases, an application serviced by the identity platform 117 or by an on-premises identity management platform has removed one or more of its cookie files. In such cases, the identity platform may detect that cookies were removed (indicating a potential security breach) and may invalidate the user's session across other applications or devices. Thus, when the revocation signals 115 and 122 are received by relying entities and identity platforms, the user's login sessions are invalidated across potentially many different services or devices. Applications 107 may be closed upon receiving such a signal, and may be unusable until new, valid credentials have been provided. In this manner, applications 107 may rely on the identity platform for user session information, and may terminate operation upon learning that a user login session is invalid.

In some embodiments, the relying parties 123 may already have a synchronization contract with an identity platform 117 that provides authentication and user management. In such cases, a generated signal (e.g. 122) may be provided to the relying parties using a synchronization signal that would have been sent as part of normal operation within the synchronization contract. The revocation signal 122 effectively piggy backs on the synchronization signal, notifying the relying parties on the next synchronization. In more urgent cases, the revocation signal may be pushed out to the relying parties so they can act more quickly to revoke the user's sessions. The identity platform may invalidate the session artifact 109 associated with the login session 107, and may notify the relying parties using synchronization messages. In this manner, bandwidth may be conserved and processing power may be reduced as existing synchronization infrastructure is used to propagate the revocation signal. Still further, in some cases, a user's login session may be revoked based on a determination of the user's state information in a session management application. For instance, session management applications such as those implementing Open ID Connect session management may maintain a state for the user's login session. If that state information indicates that the account may be compromised or is otherwise invalid, a revocation signal 122 may be issued to revoke the user's login sessions across multiple applications and/or devices.

FIG. 3 illustrates a flowchart of a method 300 for signaling to one or more entities that a login session is to be revoked. The method 300 will now be described with frequent reference to the components and data of environment 100.

Method 300 includes an act of receiving an indication that one or more credentials associated with a user account have been changed, the user account having at least one associated login session (act 310). For example, communications module 104A of computer system 101A may receive signal 122 indicating that credentials associated with user 111 have changed. The computer system 101A may determine that a session token 110 associated with the user's login session was issued before the time of credential change indicated on the received indication (act 320) and, based on the determination, signal to an identity platform 117 that the user's login session is to be revoked (act 330). The signal generating module 114 of computer system 101A may generate signal 115 and send it to the identity platform 117. The signal is a revocation signal indicating that the user's credentials are no longer valid and that login sessions associated with that user are to be revoked.

In some embodiments, signaling to an identity platform that the user's login session is to be revoked includes synchronizing a password timestamp with the identity platform. The password timestamp may indicate the last time the user changed their password. If the password timestamp indicates a time that is later than when the session was initially established, then the session will be invalidated. In some cases, an indication that credentials associated with a user account have been changed may be the result of a user who has selected an option to invalidate associated login sessions. Accordingly, user 111 may be able to select an option that says something similar to "invalidate my login sessions". Once such an option is selected, the identity platform 117 may be notified via indication 116 or via a revocation signal 115. Similarly, an administrator may indicate via such an option that sessions associated with the user are to be invalidated. Accordingly, the administrator 105 may select a user or group of users who are known or suspected to have compromised accounts, and may select an option to invalidate their login sessions. If such an option is selected, revocation signals may be provided by computer system 101A or by computer system 101B, depending on configuration.

Figure 4:
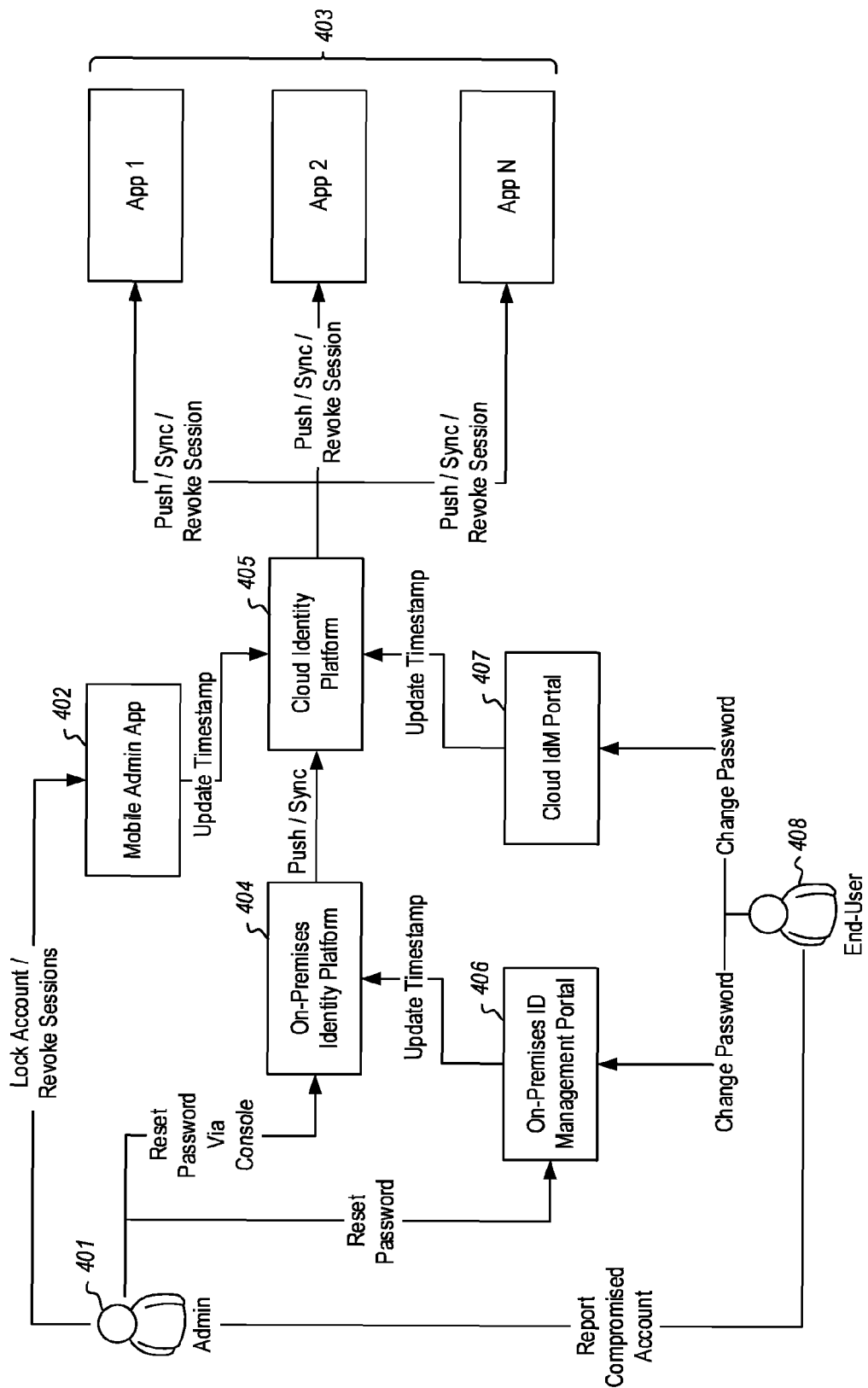
FIG. 4 illustrates an embodiment in which administrators and end users may initiate revocation of sessions by changing credentials or causing credentials to be changed.

As shown in FIG. 4, an administrator 401 may perform various options including locking an account, resetting a user's password via console or otherwise, or reporting compromised accounts. The administrator may, for example, use a mobile admin application 402, on-premises identity platform 404 or on-premises identity management portal 406 to perform these operations. The end-user 408 may also use an on-premises identity management platform 406 or cloud identity management portal 407 to change their password or other login credentials. The on-premises identity platform 404 may synchronize with the cloud identity platform 405 which may be configured to synchronize with one or more running applications 403. The cloud identity platform 405 may also revoke sessions and terminate the applications 403. Accordingly, the various components of FIG. 4 may work together to allow administrators and end users to reset and change credentials, revoke sessions and terminate applications.

Still further, in some embodiments, an application programming interface (API) may be provided that allows developers (including potentially third party developers) to integrate signaling into tools or workflows. Accordingly, in one example, a developer may cause a revocation signal to be issued automatically upon initiation of a change password or similar workflow. Once a user's account has been deemed compromised, the user may be prompted to re-authenticate. In some cases, the user may be prompted to re-authenticate using an authentication means that is different than that used to authenticate the session that was revoked. As such, if the user authenticated via computer system 101A the first time, the user may be prompted to re-authenticate using a mobile device which may use SMS messaging, email, voice authentication, biometric information (such as fingerprint) or other means of authentication. In this manner, users can authenticate to an identity platform and stay logged in for a substantial amount of time. If the user's account becomes compromised during that time, the revocation signals may be issued to substantially reduce the time that an attacker may be able to use the compromised account.

Accordingly, methods, systems and computer program products are provided which revoke user sessions using signaling. Moreover, methods, systems and computer program products are provided which signal to one or more entities that a login session is to be revoked. This allows the use of long session artifacts while still controlling the amount of time between a compromise and a safe account.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their ope.

We claim:

1. A computer-implemented method for signaling to one or more entities that a session previously initiated by a user is to be revoked, the method comprising acts of:
   receiving an indication that one or more credentials associated with a user account have been changed, the user account having at least one associated session previously initiated for the user account;
   determining that a session token associated with the previously initiated session was issued before the received indication of the one or more changed credentials for the user account; and
   based on the determination, signaling to an identity platform that the associated session previously initiated is to be revoked, wherein signaling to the identity platform that the previously initiated session is to be revoked comprises synchronizing a password timestamp with the identity platform.

2. The computer-implemented method of claim 1, wherein the password timestamp indicates the last time a user has changed their password.

3. The computer-implemented method of claim 1, wherein the indication that one or more credentials associated with a user account have been changed is received from a user that has selected an option to revoke the associated session previously initiated.

4. The computer-implemented method of claim 1, wherein the indication that one or more credentials associated with a user account have been changed is received from an administrator who has indicated that the previously initiated session is to be revoked.

5. The computer-implemented method of claim 1, wherein the ability to signal to an identity platform that a previously initiated session is to be revoked is integrated into tools or workflows of a developer using an application programming interface (API).

6. The computer-implemented method of claim 1, further comprising indicating that the user account is to be re-authenticated using an authentication means that is different than that used to authenticate the revoked session that was previously initiated.

7. The computer-implemented method of claim 1, wherein the indication that one or more credentials associated with a user account have been changed comprises a signal indicating that credentials of a user of the account are no longer valid.

8. A computer system comprising:
   one or more processors;
   one or more computer-readable storage media having stored thereon computer-executable instructions that, when executed by the one or more processors, cause the computing system to perform a method for revoking user sessions using signaling, wherein the method comprises acts of:
      receiving an indication that one or more credentials associated with a user account have been changed, the user account having at least one associated session previously initiated for the user account;
      determining that a session token associated with the previously initiated session was issued before the received indication of the one or more changed credentials for the user account; and
      based on the determination, signaling to an identity platform that the associated session previously initiated is to be revoked, wherein signaling to the identity platform that the previously initiated session is to be revoked comprises synchronizing a password timestamp with the identity platform.

9. The computer system of claim 8, wherein the password timestamp indicates the last time a user has changed their password.

10. The computer system of claim 8, wherein the indication that one or more credentials associated with a user account have been changed is received from a user that has selected an option to revoke the associated session previously initiated.

11. The computer system of claim 8, wherein the indication that one or more credentials associated with a user account have been changed is received from an administrator who has indicated that the previously initiated session is to be revoked.

12. The computer system of claim 8, wherein the ability to signal to an identity platform that a previously initiated session is to be revoked is integrated into tools or workflows of a developer using an application programming interface (API).

13. The computer system of claim 8, further comprising indicating that the user account is to be re-authenticated using an authentication means that is different than that used to authenticate the revoked session that was previously initiated.

14. The computer system of claim 8, wherein the indication that one or more credentials associated with a user account have been changed comprises a signal indicating that credentials of a user of the account are no longer valid.

15. A computer program product comprising one or more hardware storage devices having thereon computer-executable instructions that are structured such that, when executed by one or more processors of a computing system, configure a computing system to perform a method for signaling to one or more entities that a session previously initiated by a user is to be revoked, and wherein the method comprises:
   receiving an indication that one or more credentials associated with a user account have been changed, the user account having at least one associated session previously initiated for the user account;
   determining that a session token associated with the previously initiated session was issued before the received indication of the one or more changed credentials for the user account; and
   based on the determination, signaling to an identity platform that the associated session previously initiated is to be revoked, wherein signaling to the identity platform that the previously initiated session is to be revoked comprises synchronizing a password timestamp with the identity platform.

16. The computer program product of claim 15, wherein the indication that one or more credentials associated with a user account have been changed is received from a user that has selected an option to revoke the associated session previously initiated.

17. The computer program product of claim 15, wherein the indication that one or more credentials associated with a user account have been changed is received from an administrator who has indicated that the previously initiated session is to be revoked.

* * * * *